F. S. HASBROUCK.

Assignee, by mesne assignments, of J. W. WILCOX.

DOCUMENT ENVELOPE.

No. 9,792. Reissued July 5, 1881.

Witnesses:-

Eric Haynes

Thomas E. Birch.

Inventor:-

Frederick S. Hasbrouck

John W. Wilcox,

By his Attorneys

Brown & Brown

N. PETERS, Photo-Lithographer, Washington, D. C.

UNITED STATES PATENT OFFICE.

FREDERICK S. HASBROUCK, OF NEW YORK, N. Y., ASSIGNEE, BY MESNE ASSIGNMENTS, OF JOHN W. WILCOX.

DOCUMENT-ENVELOPE.

SPECIFICATION forming part of Reissued Letters Patent No. 9,792, dated July 5, 1881.

Original No. 67,092, dated July 23, 1867. Application for reissue filed May 23, 1881.

*To all whom it may concern:*

Be it known that JOHN W. WILCOX, of the city, county, and State of New York, invented a new and useful Improvement in Envelopes; and the following is a full, clear, and exact description thereof, which will enable others skilled in the art to make and use the same, reference being had to the accompanying drawings, forming part of this specification, in which—

Figure 1:
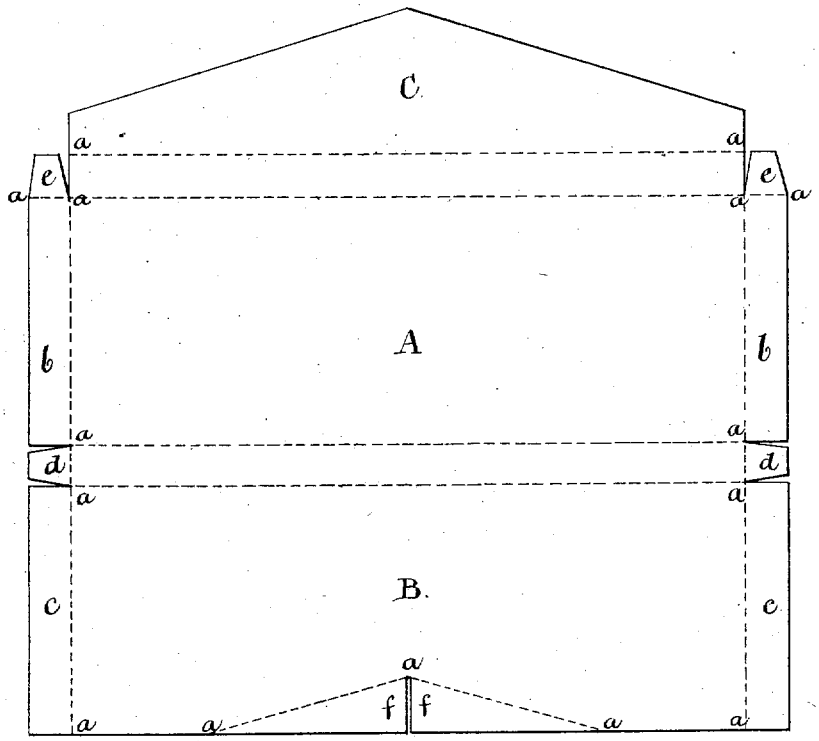
Figure 2:
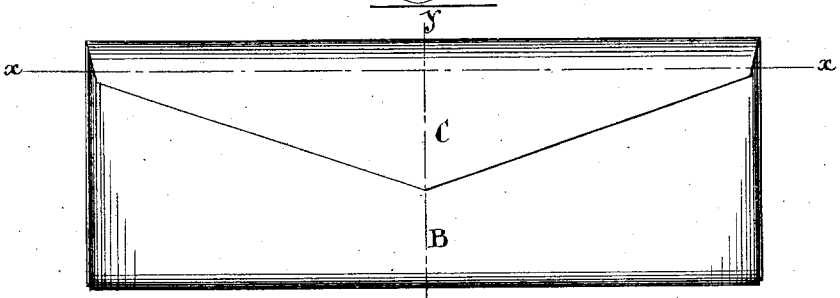
Figure 3:
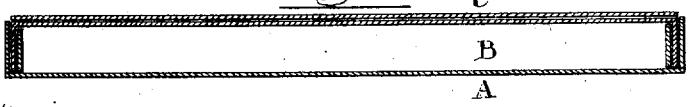
Figure 4:
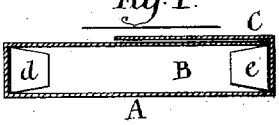

Figure 1 is a plan view of the paper as cut and creased for folding and forming the improved box-envelope. Fig. 2 is a top view of the envelope when finished. Fig. 3 is a longitudinal section of the improved box-envelope, taken in the line *x x*, Fig. 2; and Fig. 4 is a transverse section of the same, taken in the line *y y*, Fig. 2.

Similar letters of reference designate like parts.

This invention relates to an improved mode of forming box or document envelopes; and it consists in so cutting the paper or other material of which they are made as to involve the least possible waste, and in creasing and folding the ends of the envelopes together in such manner that they are fortified and stiffened by a double thickness of the material throughout.

It also consists in so cutting and folding the paper or other material that there will be a treble thickness at the corners, the box-envelope being formed wholly of one sheet and very materially improved in construction and made stronger than by any known method of arrangement.

For cutting the form or pattern of the envelope and creasing it for folding, as represented in Fig. 1, there are employed the usual tools and processes of the trade, and the paper or other material is cut in the geometrical proportions required to make the ordinary rectangular envelopes for containing documents, commonly called "box-envelopes," which are in the form of a parallelopiped.

In Fig. 1, A is the back of the envelope, B the top, and C the flap. The dotted lines *a a* in the drawings indicate the creases in which the folds of the envelope are made to give it the proper form for construction and use. On the ends of the envelope creases are made at proper distance from the outer edges and parallel to them, and in line with the cut at the ends of the flap C. These creases extend across the pattern of the envelope, to make flaps for turning up and forming the ends of the box-envelope, *b b* being the flaps thus provided on the back A, and *c c* the flaps on the top B. These flaps are severally as wide as the depth or interior thickness of the envelope. Between the flaps *b b* and *c c* at each end of the envelope, as here shown, are small flaps or tongues *d d*, and on the opposite ends of the flaps *b b* are similar small flaps or tongues *e e*, which flaps are all made by cutting away narrow strips of the material, or by division-cuts running from the edge of the pattern to the creases for folding. When the pattern has been cut and creased in this manner the box-envelope is formed by folding the top B over the back A in the usual way and in such manner that the end flaps *b b* and *c c* shall be overlapped, lie against and in each other at their respective ends, and be pasted or gummed together, as shown by Fig. 3. By this arrangement of the parts the ends of the box-envelope are made of double thickness of the material throughout, to give strength precisely where it is most needed and to furnish substantial transverse supports for the envelope, whereby it will be preserved in box-like form. The small flaps or tongues *e e* and *d d* are also folded in and pasted down upon the ends, either between the flaps *b b* and *c c* or on the inside, as desired, and as shown in Fig. 4. This arrangement of the small flaps, so far as they extend, makes a treble thickness of the ends, and, being in the corners of the envelope, affords great additional strength at points which require fortifying.

A further improvement in the construction of envelopes is doubling and pasting two angular flaps, *f f*, within the top B, which are formed by making one division-cut running a short distance from the edge, and creasing from its terminus to the edge at any desired angle, as shown by Fig. 1. These flaps add strength to the middle of the envelope, where the ends of documents are introduced, and the tie of the flap binds, which is a point of importance and value. The flap C is turned over and secured in the ordinary way when used.

Having thus described the invention, what is claimed as new, and desired to be secured by Letters Patent, is—

1. A box or document envelope with double ends throughout, consisting of overlapped and united flaps, substantially as specified.

2. A box or document envelope with double ends throughout and treble ends in part, made by folding and uniting flaps cut out of one sheet of paper or other material, substantially as herein described.

3. A box or document envelope provided with the angular flaps *f f*, folded over and secured to the top B, substantially as specified.

FREDERICK S. HASBROUCK.

Witnesses:

T. J. KEANE,

FREDK. HAYNES.